US007156936B2

(12) United States Patent
Frantz et al.

(10) Patent No.: US 7,156,936 B2
(45) Date of Patent: Jan. 2, 2007

(54) CAMOUFLAGE OR OTHERWISE MULTICOLORED PATTERN TIRE AND METHOD OF MANUFACTURING

(75) Inventors: David Mark Frantz, Norton, OH (US); Bina Patel Botts, Cuyahoga Falls, OH (US); George Frank Balogh, North Canton, OH (US); James Robert Herberger, Sr., Canal Fulton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 284 days.

(21) Appl. No.: 10/611,520

(22) Filed: Jul. 1, 2003

(65) Prior Publication Data

US 2005/0000616 A1    Jan. 6, 2005

(51) Int. Cl.
B29D 30/72 (2006.01)
(52) U.S. Cl. .................................. 156/116; 152/524
(58) Field of Classification Search ............. 156/116, 156/123, 130.7, 252; 152/524, 525; 428/919, 428/131, 134, 136
See application file for complete search history.

(56) References Cited

U.S. PATENT DOCUMENTS

| | | | |
|---|---|---|---|
| 1,989,703 A | 2/1935 | Leguillon | 18/61 |
| 2,351,142 A * | 6/1944 | Mitchell | 428/136 |
| 2,985,216 A * | 5/1961 | William et al. | 156/277 |
| 3,233,647 A * | 2/1966 | Newell | 152/152.1 |
| 3,280,427 A | 10/1966 | Smith | 18/13 |
| 3,769,123 A | 10/1973 | Botts et al. | 156/116 |
| 4,224,268 A | 9/1980 | Merli et al. | 264/139 |
| 4,323,605 A * | 4/1982 | Rush | 428/17 |
| 4,552,521 A | 11/1985 | Linnstaedter | 425/131.1 |
| 4,767,481 A | 8/1988 | Bryant et al. | 156/116 |
| 5,077,101 A * | 12/1991 | Conway et al. | 428/17 |
| 5,653,840 A | 8/1997 | Makinson et al. | 156/116 |
| 5,807,446 A | 9/1998 | Ratliff, Jr. | 152/523 |
| 6,279,633 B1 | 8/2001 | Corvasce | 152/525 |
| 6,583,210 B1 | 6/2003 | Zanzig et al. | 524/492 |
| D477,807 S | 7/2003 | Zanzig et al. | |
| D478,861 S | 8/2003 | Zanzig et al. | |
| D480,041 S | 9/2003 | Zanzig et al. | |
| 2001/0049644 A1 | 12/2001 | Webb et al. | 705/27 |
| 2002/0100528 A1 | 8/2002 | Sandstrom et al. | 152/210 |
| 2003/0140999 A1 | 7/2003 | Smith et al. | 152/524 |
| 2003/0234067 A1 | 12/2003 | Kataoka et al. | 152/525 |
| 2004/0020575 A1 | 2/2004 | Zanzig et al. | 152/151 |
| 2004/0060640 A1 | 4/2004 | Pialot | 156/116 |
| 2004/0144462 A1 | 7/2004 | Zanzig et al. | 152/151 |

FOREIGN PATENT DOCUMENTS

DE    196 30 586    2/1998

(Continued)

OTHER PUBLICATIONS

Translation of DE 19630586.*

(Continued)

Primary Examiner—Geoffrey L. Knable
(74) Attorney, Agent, or Firm—John D. DeLong

(57) ABSTRACT

A tire 2 having a colored pattern veneered surface 12 formed by one or more layers 46 of distinct colors applied to the outer surface of the tire 2 on the sidewall 5 and possibly the tread 7 is disclosed as well as the method of manufacturing the tire 2. The colored pattern veneer can be used to make a camouflage tire among other patterns.

3 Claims, 5 Drawing Sheets

FOREIGN PATENT DOCUMENTS

| | | |
|---|---|---|
| EP | 0 857 761 | 8/1998 |
| EP | 1 228 898 | 8/2002 |
| EP | 1 452 345 | 9/2004 |
| JP | 2002192904 | 7/2002 |

OTHER PUBLICATIONS

Patent Abstracts of Japan, vol. 1997, No. 5 (JP 9 001694).

European Search Report.

* cited by examiner

CAMOUFLAGE OR OTHERWISE MULTICOLORED PATTERN TIRE AND METHOD OF MANUFACTURING

FIELD OF THE INVENTION

This invention relates to multicolored pattern tires generally, and more particularly camouflaged tires and a method of manufacturing such tires.

BACKGROUND OF THE INVENTION

Camouflage is a way to hide or conceal a person or an object from its surroundings. The objective is to blend into the environment and to avoid detection. In nature, color blending is used for both defensive and avoiding detection purposes such as white rabbits in snow covered regions. Alternatively, camouflage is used by hunter predators such as white polar bears to gain an offensive advantage of surprise when trying to capture prey.

Some reptiles such as camelians even can change color to blend into the surroundings to further advance their concealment in an effort to capture fast moving insects.

The natural techniques of concealment have been adapted by humans in recreational hunting and for military purposes.

For years the art of concealment by the use of camouflage has evolved from the simple use of netting to the art of painting vehicles and dressing personnel by using specific camouflaged patterns.

In the case of vehicles, one area that has been both overlooked and avoided has been the tires of the vehicles. Some attempts to provide camouflage netting over the wheel wells have been attempted but basically the concept of wheel concealment has been ignored. This is partly because the wheel is already in the shadows of the body of the vehicle in some cases and in other cases it has been generally understood that large vehicles on the move are easily detected. Accordingly, these vehicles are generally covered by camouflage netting when they are stopped. However, when on the move these vehicles generally do not rely heavily on their camouflage.

In recent years small agile, very fast reconnaissance vehicles are being used by scouts or Special Forces troops who require the element of concealment and surprise to accomplish their objectives. These soldiers have adopted four and six wheel off road vehicles similar to the All Terrain Vehicle (ATV) vehicles used for recreational hunting.

These vehicles have the tires generally exposed and the tires are a dominant visual pattern easily spotted by opposing forces, whether the vehicles are moving or stationary the tires become a prominent feature that can be easily detected.

It is an object of the present invention to provide a camouflaged tire to enhance concealment of vehicles.

It is another object of the present invention to provide a simple and efficient way to produce such a tire that can survive harsh off road conditions.

SUMMARY OF THE INVENTION

A method of manufacturing a tire has the steps of applying an uncured elastomeric colored pattern veneer onto an uncured tire and curing the tire.

In one method the veneer is formed by passing a base layer of a first color through a roller and randomly pressing color pellets of one or more additional colors of elastomeric material into the base layer.

One method of applying the veneer to make a multicolored tire includes the steps of applying at least one colored layer of perforated elastomeric material onto the peripheral surface of an uncured tire assembly. When applied, the perforations form openings in the first layer to expose portions of the tire to create at least two distinct colors in a multicolored pattern. Also, a three color pattern can be achieved by applying a thin second colored layer of perforated elastomeric material onto the peripheral surface of the thin first colored layer and the uncured tire assembly. It is preferred that the steps of applying the first and second layer further include the step of stretching the layers to increase the perforations into enlarged irregular shaped openings. It is believed that the perforated elastomeric layers may have the perforations made in the forms of slits or cuts or even openings of varying lengths and shapes or combinations of such features to enhance the irregular pattern required in camouflaging. It is believed that these thin elastomeric layers can be applied to an uncured tire assembly. The tire assembly can then be shaped and formed into its toroidal shape and then cured in a mold curing press as commonly done with tires.

The resultant method produces a camouflaged tire having an elastomeric veneered outer layer adhering to at least the sidewall portion of the tire. This veneered outer layer will have one or more distinct colors not including the color of the base underlying tire. When molded, the resultant tire has two distinct colors or more depending on the number of layers applied to the tire to form the veneered surface. The color combinations can vary as well as the number of colors. The tire can be black as commonly found in tires and a veneered surface may have a green layer and a brown layer to form a three-color camouflage pattern of black, green and brown. Alternatively, the tire can be black and have a white layer and gray layer applied to form a winter or urban camouflage pattern. Additionally, the tire can be black or dark brown and have a veneered surface of light brown or tan forming a desert camouflage pattern.

Additionally, a clear outer elastomeric layer can be applied over the entire veneered surface to form a clear outer layer as a protective barrier for the camouflage pattern if so desired. It is possible that the clear layer can actually be a urethane material and may provide a clear outer tread and sidewall covering such that the underlying veneered pattern overlies the carcass and is interposed between a clear outer tread layer and sidewall layers. Furthermore, an anti-migrating barrier layer can be placed between the colored veneer layers and the underlying tire in order to prevent migrating of staining materials leaching outward into the colored pattern.

DETAILED DESCRIPTION OF THE INVENTION

Figure 1:
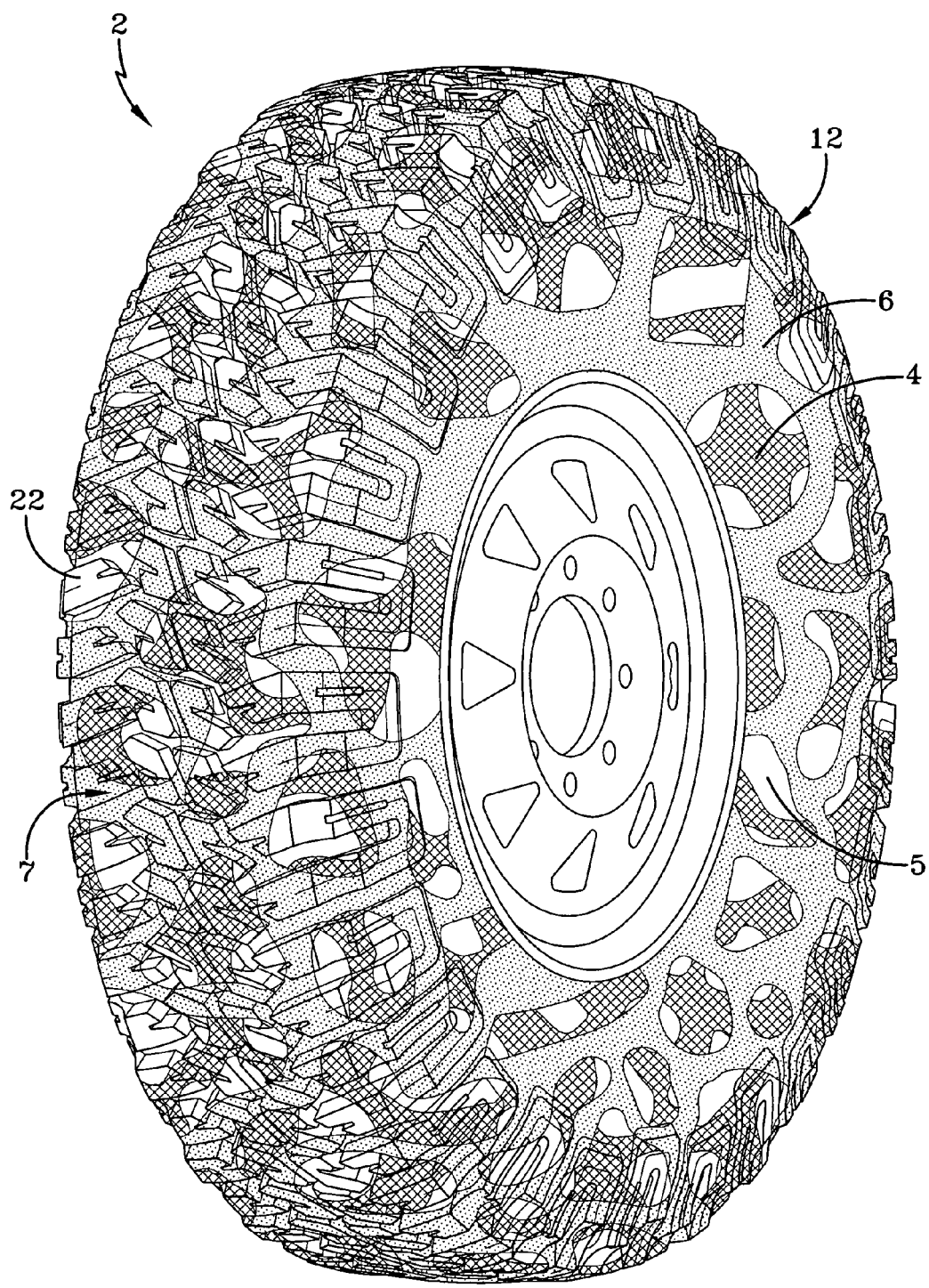
FIG. 1 is a perspective view of a camouflaged tire according to the invention.
Figure 2:
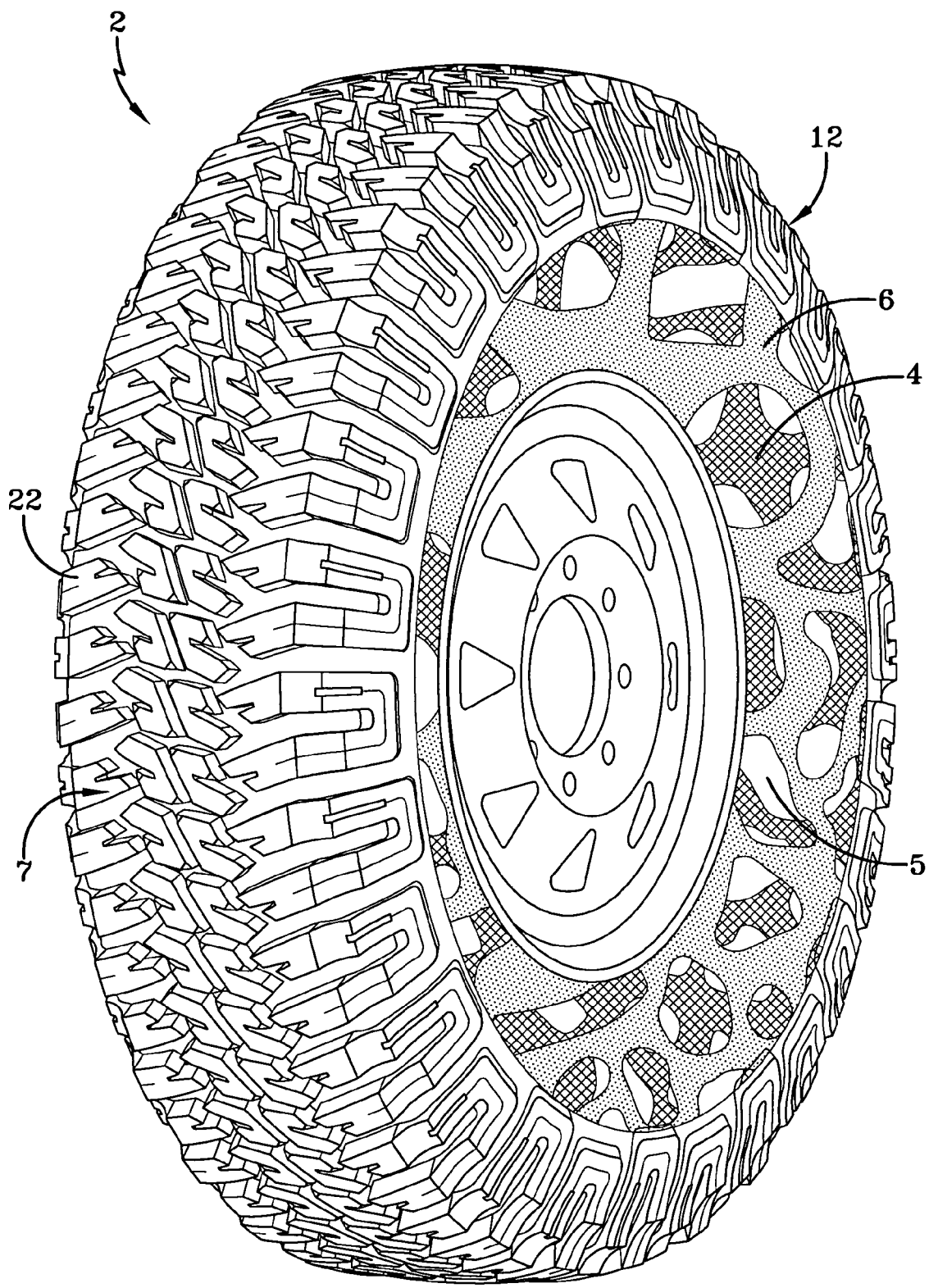
FIG. 2 is a perspective view of a tire wherein one or both sidewalls have a camouflaged surface.
Figure 3:
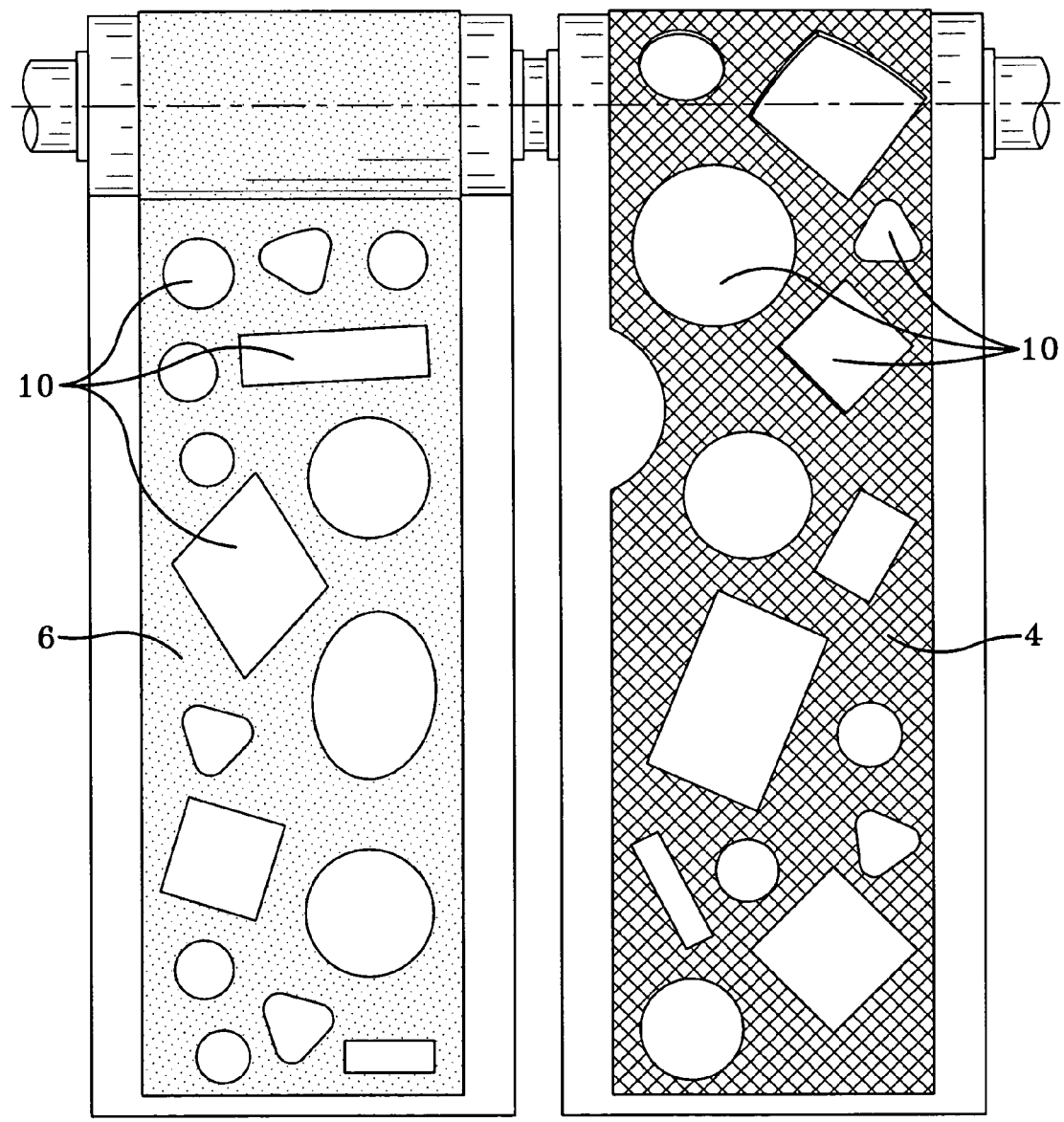
FIG. 3 is a view of two elastomeric sheets or layers of colored materials for producing a camouflaged tire.
Figure 4:
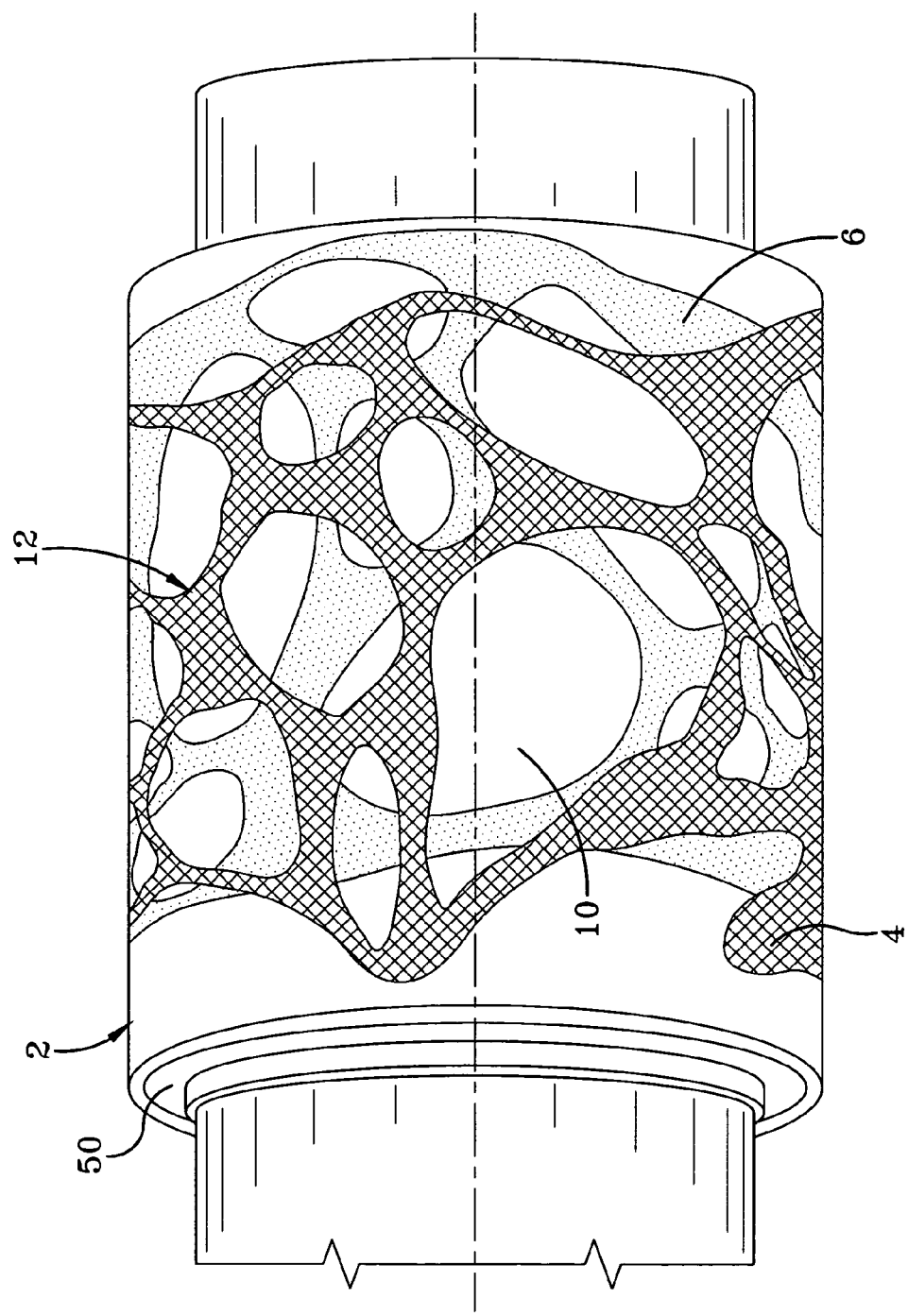
FIG. 4 shows an uncured tire assembly on a building drum having a first colored layer and a second colored layer applied to the peripheral surface of the uncured tire.

With reference to FIG. 1, a perspective view of an exemplary camouflaged tire 2 made according to the invention is illustrated. As shown the tire 2 has three distinct colors, one color being the black or dark color of the underlying tire 2. The other two colors are contrasting colors provided in irregular shapes and patterns on the surface of the tire to form a camouflage pattern 12 that blends in with the surrounding environment. As shown, the camouflage pattern 12 has three distinct colors. The first and second colors are formed by elastomeric layers or sheets 4 or 6 that are applied to the tire 2 in the uncured state. In an overlying arrangement on the tire each of these sheets has openings that are irregular in shape and pattern such that the underlying surfaces are exposed through these openings. This gives the ability to see the underlying color when the tire 2 is molded. This method of laying up sheets of material is best illustrated in FIGS. 3 and 4. FIG. 3 shows each of the layers or sheets 4, 6 of material with perforations 10 of irregular shape. FIG. 4 shows these sheets 4, 6 of material being stretched on a tire building drum 50. The stretching of the material is optional and although not required helps enhance the irregular shape and gives greater non-uniformity to the patterns. As the first layer 4 is applied using one turn of the building drum 50 it is stitched onto the uncured tire assembly 2 and firmly attached. Then a second thin layer 6 of material is applied of a different color as illustrated. The result is the tire as shown in FIG. 1. Alternatively, the materials of the first and second layer 4, 6 can be provided such that they are only applied to the sidewall portions of the uncured tire 2. In such case, narrower webs of material can be used and stretched and stitched directly onto the carcass in the sidewall area 5 on both sides of the tire 2 or only one side 5 of the tire 2. When using such a technique, the camouflage surface 12 will extend up to the tread area 7 but not necessarily extend over it. In such a pattern the treads 7 would then be left in their original black shape, however, as shown in FIG. 2 but the sidewalls 5 would have the camouflage feature. This may be desirable due to the fact that as the tread 7 wears the camouflage surface 12 at least at the tread lugs 22 will tend to disappear and will only remain in the groove areas of the tread. While this may be acceptable in some applications, it may be preferable simply to only camouflage the sidewalls 5. This may be particularly true in trucks or other vehicles where the sidewalls are exposed but the tread is within the wheel well of the vehicle.

An alternative method of applying the camouflage surface 12 is to create irregular shapes or patches that can be applied to the outer surface of the green or uncured tire. These patches can then be overlaid or superimposed by additional patches of different colors. In this manner of manufacturing a camouflaged tire 2 the colors are provided by the patches and any number of colors can be achieved depending on the number of patches desired as an alternative to the use of layers 4 and 6. Fundamentally, the overall shape of the tire 2 would not change significantly using this method of manufacturing a camouflaged tire.

Figure 5:
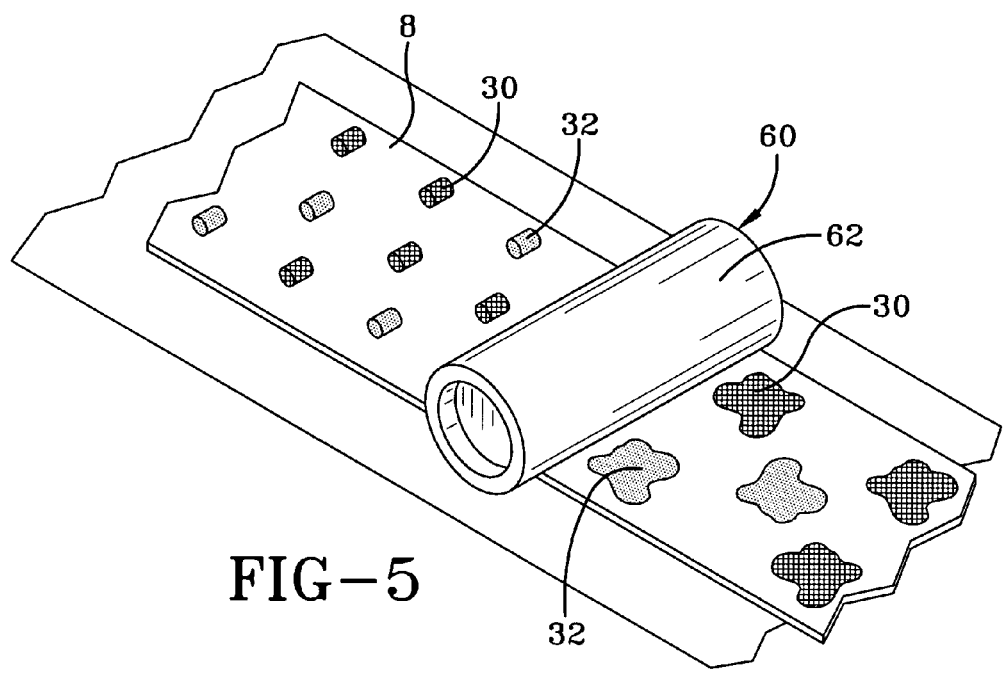
FIG. 5 shows a veneer base layer being formed according to an alternative embodiment of the invention.
Figure 6:
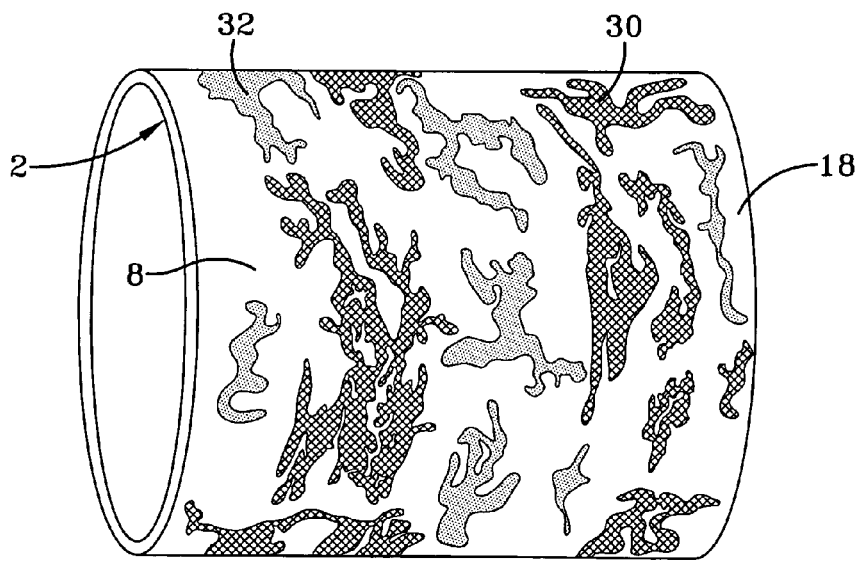
FIG. 6 is a perspective view showing the uncured tire assembly having the veneer of FIG. 5 applied.

With reference to FIG. 5, another alternative method of forming the veneer 18 is to take a base layer of uncured elastomeric material and randomly press colored pellets 30, 32 of uncured elastomeric into the base layer. By way of example, the base compound for the gum sheet is preferably with non-staining ingredients, reinforced with a silica filler containing polymers and curatives compatible and co-curable with the tire tread and sidewall compounds. As illustrated the base layer 8 can pass under a means 60 for pressing the pellets such as a roller 62 or a pair of rollers or a simple stamping press. The flattened colored pellets provide distinct colors that can create a camouflage type appearance or similar marbleized effect to form a pattern of discrete colors. The pressing of the pellets creates flattened irregular shape colors. The enhanced shape changes the pellets and may further be varied in size or shape. The resultant uncured tire 2 with the veneer layer 18 applied to the outer surface is shown in FIG. 6. Alternatively, as opposed to forming a veneer using the method shown in FIG. 5, an entire tread or sidewall can be made full depth multicolored using the colored pellets 30, 32 of elastomeric material. This has the advantage of full color retention throughout the tire's life.

In preparing the pellets 30, 32 to be processed into a base layer, it is important that the pellets 30, 32 be heated to lower the viscosity to properly disperse the color to form a uniform gauge sheet.

As a further alternative embodiment, a clear coating or layer of materials such as urethane could be applied to the outer surface of the uncured tire and cured with the uncured tire in such a fashion that the underlying veneer of the camouflage surface 12 can be protected. It is possible, in the case of light ATV tires, that a complete urethane tire 2 where the tread 7 and sidewalls 5 are clear and applied over the veneer camouflage surface 12 to protect the veneer camouflage surface. It is possible in the case of ATV tires that a complete urethane tire 2 where the tread 7 and sidewalls 5 are clear and applied over the veneer surface to protect the veneer surface with the underlying tire carcass being entirely urethane or a rubber material for added strength. In such a fashion a camouflage tire 2 having an exterior clear rubber layer forming the tread and sidewall could be used where the underlying veneer camouflage surface 12 is embedded well within the tire 2. This has the advantage of protecting the veneer camouflage surface 12 and ensuring that it survives throughout the useful life of the tire 2. It is believed that the survival of the veneer camouflage surface 12 in the sidewall 5 will be more than sufficient for the useful life of the tire 2. However, it is understood that as the tread wears using the first method of manufacture wherein the tread lugs 22 are coated with the veneered camouflage surface 12 as illustrated in FIG. 1 the black underlying rubber will eventually be exposed such that the tread lugs 22 will show as the tread wears.

It has been found that the proper selection of elastomeric materials compatible with the tread 7 and sidewall 5 are sufficient to provide excellent adhesion of the layers 46 such that they do not peel or abrade from the surface 12 but are actually integrally bonded to the underlying materials. This is important as the end user does not want the camouflaging to peel off or to be lost due to the extreme flexure and punctures and scratches that are accomplished in off road tire vehicle use.

It is important to understand that the perforations 10 used in the manufacture of the sheets or layers 4, 6 as illustrated in FIG. 3 can be simple slits or incisions in narrow webs of material. These slits or incisions 10 can be varied and as the material layers 4, 6 are stretched prior to applying to the tire 2 on the tire building drum 50 the stretching of the layers 4, 5 will create the openings 10 needed to achieve the underlying camouflage effect of the various layers forming the veneered camouflage surface pattern. Alternatively, regular or irregular shaped cutouts or openings can be used as the perforations and may or may not be stretched to achieve the desired look. As previously noted the underlying tire 2 provides one of the colors for the camouflage surface 12 while the veneer surface can provide two or more other distinct colors. Accordingly, in urban and snow areas the black tire can be used in combination with varying amounts of white and gray to achieve either the urban or the snow colored tire for that particular camouflage requirement. Alternatively, the forest camouflage commonly used in wooded areas can use the green, tan and black to achieve a desired camouflage technique for that environment. Finally, a tire can be manufactured with a color other than black such as brown and a lighter brown and tan can be used to achieve a sand or desert type camouflage.

While this invention has been directed primarily for the purpose of camouflaging tires, it is also directly applicable to providing tires having distinct colors or patterns by employing one or more colored veneer surfaces, preferably multicolored. This may be desirable for aesthetic looks for appearances where one wants to achieve multicolored tires and either striped or zigzag configurations or any other pattern of more uniform nature other than for camouflaging, by way of example a black and white cow or zebra pattern or even an orange and black tiger striped pattern.

In such a case the veneer layer can be a single white or orange layer covering an underlying black tire to achieve a multicolored tire having only a two color pattern. The use of one or more perforated layers to form the veneer is therefore considered within the scope of the present invention. Accordingly, such alternative uses of layers having slits to achieve a multicolored tire are considered well within the scope of the present invention as well as using patches of elastomeric colored materials.

What is claimed is:

1. A method of manufacturing a camouflaged tire, the method comprising:
   applying a first thin colored layer of perforated elastomeric material onto the peripheral surface of an uncured tire assembly;
   applying at least one second thin colored layer of perforated elastomeric material onto the peripheral surfaces of the first thin colored layer on the uncured tire assembly;
   wherein the steps of applying the first thin colored layer and the at least one second thin colored layer further comprise stretching the layers to increase the perforations into enlarged openings, to create at least three distinct colors
   wherein perforations form openings in the layers to expose portions of the underlying surfaces to create the distinct colors in a multicolored camouflage pattern.

2. The method of claim 1 further comprises the step of:
   forming perforated elastomeric layers, the perforations being in the form of slits, cuts or openings of varying lengths and shapes or combinations of such patterns.

3. The method of claim 1 further includes the step of molding the tire to form a cured veneer camouflaged surface.

* * * * *